(12) United States Patent
Achenbach et al.

(10) Patent No.: US 6,695,091 B2
(45) Date of Patent: Feb. 24, 2004

(54) ELECTRIC STEERING MOTOR WITH INTERNAL CIRCUIT BOARD

(75) Inventors: Kurt Achenbach, White Lake, MI (US); Phil McCune, Clinton Township, MI (US)

(73) Assignee: TRW Inc., Lyndhurst, OH (US)

( * ) Notice: Subject to any disclaimer, the term of this patent is extended or adjusted under 35 U.S.C. 154(b) by 3 days.

(21) Appl. No.: 09/941,032

(22) Filed: Aug. 28, 2001

(65) Prior Publication Data

US 2003/0042066 A1 Mar. 6, 2003

(51) Int. Cl.$^7$ ................................................ B62D 5/04
(52) U.S. Cl. ....................................... 180/444; 180/446
(58) Field of Search ............................... 180/402, 444, 180/446, 443

(56) References Cited

U.S. PATENT DOCUMENTS

| | | |
|---|---|---|
| 5,265,322 A | 11/1993 | Fischer et al. |
| 5,437,349 A | 8/1995 | Kurahashi et al. |
| 5,573,079 A | 11/1996 | Suda et al. |
| 5,732,790 A | 3/1998 | Endo et al. |
| 5,785,145 A | 7/1998 | Wakao et al. |
| 5,924,518 A * | 7/1999 | D'Onofrio ................... 180/444 |
| 6,107,716 A | 8/2000 | Penketh |
| 6,123,167 A | 9/2000 | Miller et al. |
| 6,227,060 B1 * | 5/2001 | Nicot et al. ................. 180/444 |
| 6,429,553 B1 * | 8/2002 | Taniguchi et al. .......... 180/400 |

* cited by examiner

*Primary Examiner*—Daniel G. DePumpo
(74) *Attorney, Agent, or Firm*—Tarolli, Sundheim, Covell & Tummino L.L.P.

(57) ABSTRACT

A vehicle steering system (10) includes a pinion (30) and a steering member (14) movable axially to turn steerable wheels. The steering member (14) has a rack portion (34) in engagement with the pinion (30) and a screw portion (38). An electric motor (130) includes a rotor (134) and a stator (132). The screw thread portion (38) extends axially through the motor (130). A ball nut (116) rotatable with the rotor (134) is associated with the screw thread portion (38) for effecting axial movement of the steering member (14) in response to rotation of the rotor. An electronic control unit (148) for the motor (130) includes a circuit board (150) and a plurality of electronic components mounted on the circuit board. The circuit board (150) has a non-planar configuration and at least partially encircles a portion of the steering member (14) at a location spaced axially from the electric motor (130).

21 Claims, 3 Drawing Sheets

ELECTRIC STEERING MOTOR WITH INTERNAL CIRCUIT BOARD

BACKGROUND OF THE INVENTION

1. Technical Field

The present invention relates to a vehicle power assist steering system. In particular, the present invention relates to an electric power assist steering system that includes an electric assist motor and a circuit board, or electronic control module, that is mounted in a housing together with the motor.

2. Description of the Prior Art

A known type of vehicle power assist steering system includes a ball nut for transmitting force between a steering member and an electric assist motor. The steering system also includes an electronic control unit, or ECU, for controlling operation of the electric motor and for providing current to the motor. Upon actuation of the electric motor, the ball nut is driven to rotate relative to the steering member. The rotational force of the ball nut is transmitted to the steering member to drive the steering member axially. Axial movement of the steering member effects turning movement of the steerable wheels of the vehicle.

U.S. Pat. No. 5,573,079 shows an electrically operated steering apparatus including a motor driver circuit disposed in a cylindrical housing for energizing an electric motor.

U.S. Pat. No. 5,265,322 shows an electric module assembly and method of forming same including a circuit board that is bent to have a three-dimensional configuration.

SUMMARY OF THE INVENTION

The present invention is a steering assembly for turning steerable wheels of a vehicle in response to rotation of a steering wheel of the vehicle. The steering assembly includes a pinion, and a steering member that is movable axially to effect turning movement of the steerable wheels of the vehicle. The steering member has a rack portion in engagement with the pinion and an externally threaded screw portion. The steering assembly includes an electric motor comprising a rotor and a stator, the stator when energized effecting rotation of the rotor. The screw thread portion of the steering member extends axially through the electric motor. A ball nut rotatable with the rotor is associated with the screw thread portion of the steering member for effecting axial movement of the steering member in response to rotation of the rotor thereby to turn the steerable wheels of the vehicle. The steering assembly further includes an electronic control unit for helping to control operation of the electric motor. The electronic control unit includes a circuit board and a plurality of electronic components mounted on the circuit board. The circuit board has a non-planar configuration and at least partially encircles a portion of the steering member at a location spaced axially from the electric motor.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
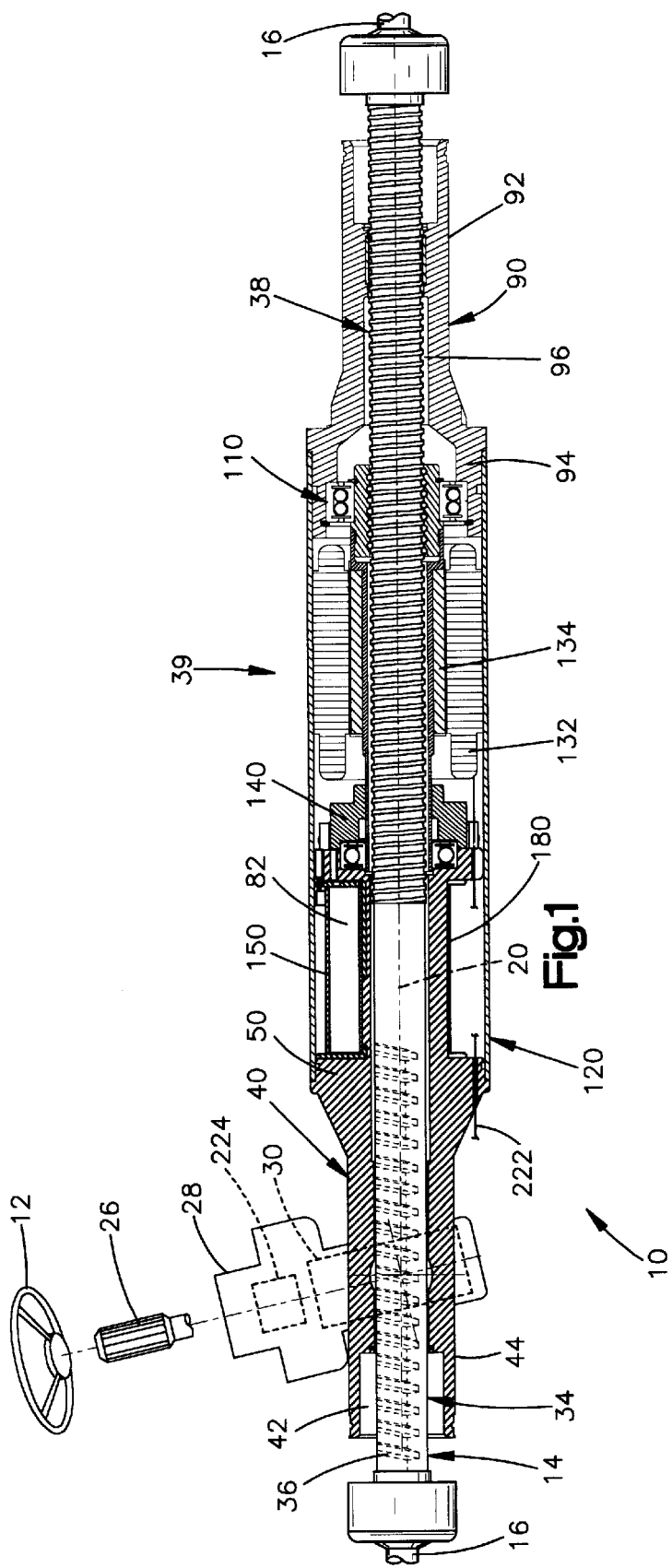
FIG. 1 is a view, partially in section, of a steering system in accordance with the present invention.

The present invention relates to a power assist steering system. In particular, the present invention relates to an electric power assist steering system that includes an electric assist motor for applying force to a steering member, such as a rack. As representative of the present invention, FIG. 1 illustrates a vehicle electric power assist steering system 10.

The steering system 10 includes a driver-operated steering wheel 12 that is operatively connected, in a manner described below, to a steering member 14. The steering member 14 is coupled with the steerable wheels (not shown) of the vehicle through tie rods 16. The steering member 14 extends along an axis 20 of the steering system 10.

The vehicle steering wheel 12 is connected for rotation with an input shaft 26 that extends into a pinion housing 28. The input shaft 26 is mechanically coupled by a torsion bar (not shown), in a known manner, to a pinion gear 30 located in the pinion housing 28.

The steering member 14 includes a first portion 34 having rack teeth 36 disposed thereon and a second portion 38 having an external screw thread convolution, axially spaced from the rack teeth. The rack teeth 36 on the steering member 14 are in meshing engagement with gear teeth (not shown) on the pinion gear 30.

The steering assembly includes a housing 39 that supports the other portions of the steering assembly. The housing 39 includes a pinion housing 40, an outboard housing 90, and a motor tube 120. The pinion housing 40 is spaced apart from the outboard housing 90 and is connected with the outboard housing by the motor tube 120.

The pinion housing 40 forms one end portion of the housing 39 of the steering system 10. The outboard housing 90 forms the opposite end portion of the housing 39 of the steering system 10.

The pinion housing 40 is preferably cast as one piece from a metal, such as aluminum, but may have a different construction. The pinion housing 40 supports the pinion gear 30 and has an axially extending central passage 42 through which the steering member 14 extends. The pinion housing 40 includes a pinion portion 44 that receives the pinion 30 and that supports the input shaft 26. The pinion portion 44 also supports the yoke (not shown) of the steering system 10.

Figure 2:
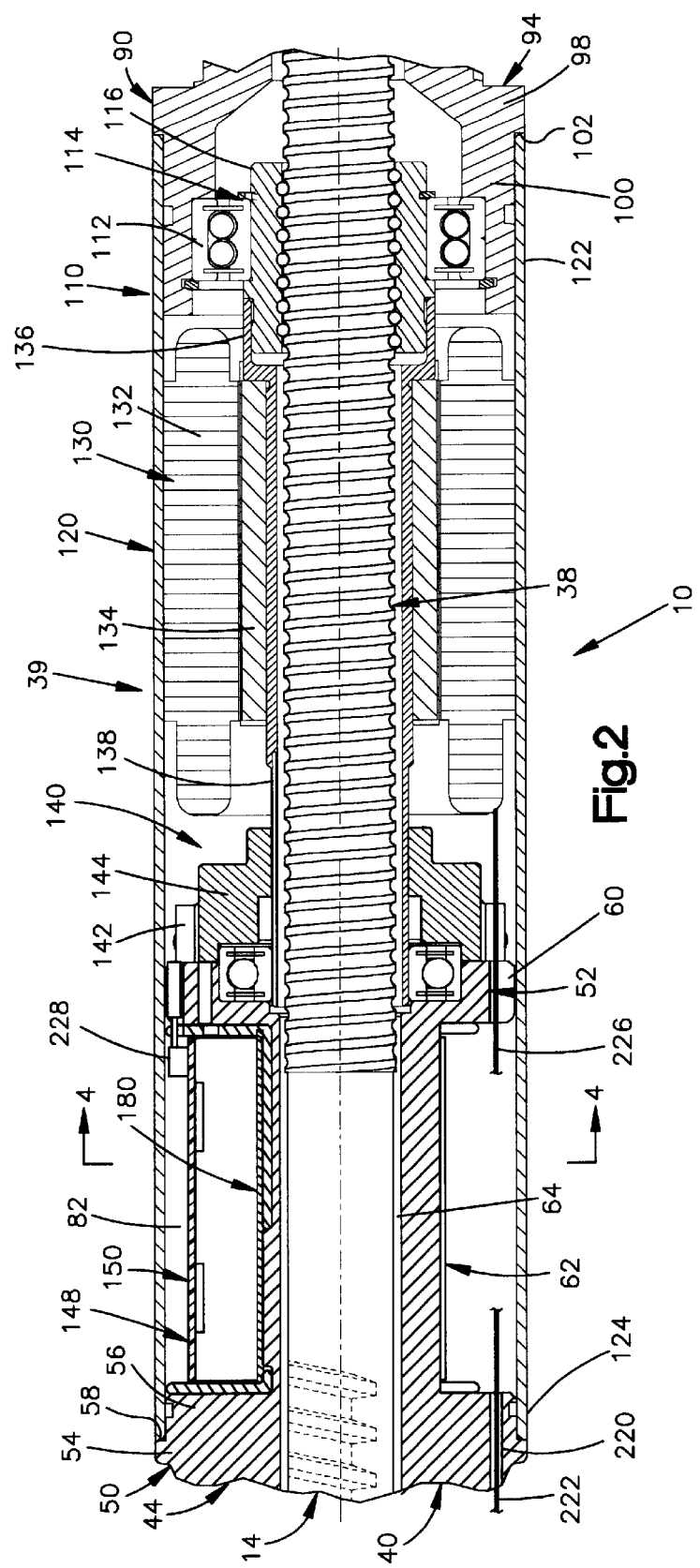
FIG. 2 is an enlarged view of a portion of the steering system of FIG. 1.

The pinion housing 40 (FIGS. 2 and 3) includes two disc-shaped end plates 50 and 52. The end plates 50 and 52 are spaced apart from each other and centered on the axis 20.

The first or outer end plate 50 of the pinion housing 40 has a larger diameter portion 54 that is closer to the pinion portion 44, and a smaller diameter portion 56 that is farther from the pinion portion 44. An annular, radially extending shoulder surface 58 (FIG. 2) is formed between the larger diameter portion 54 and the smaller diameter portion 56. The shoulder surface 58 faces toward the outboard housing 90.

The second or inner end plate 52 of the pinion housing 40 has substantially the same diameter as the smaller diameter portion 56 of the first end plate 50. A wiring pass through notch 60 is formed in the lower part of the inner end plate 52.

A connector portion 62 of the pinion housing 40 extends between and interconnects the end plates 50 and 52. The connector portion 62 is hollow, having a central passage 64 through which the steering member 14 extends, as described below.

Figure 4:
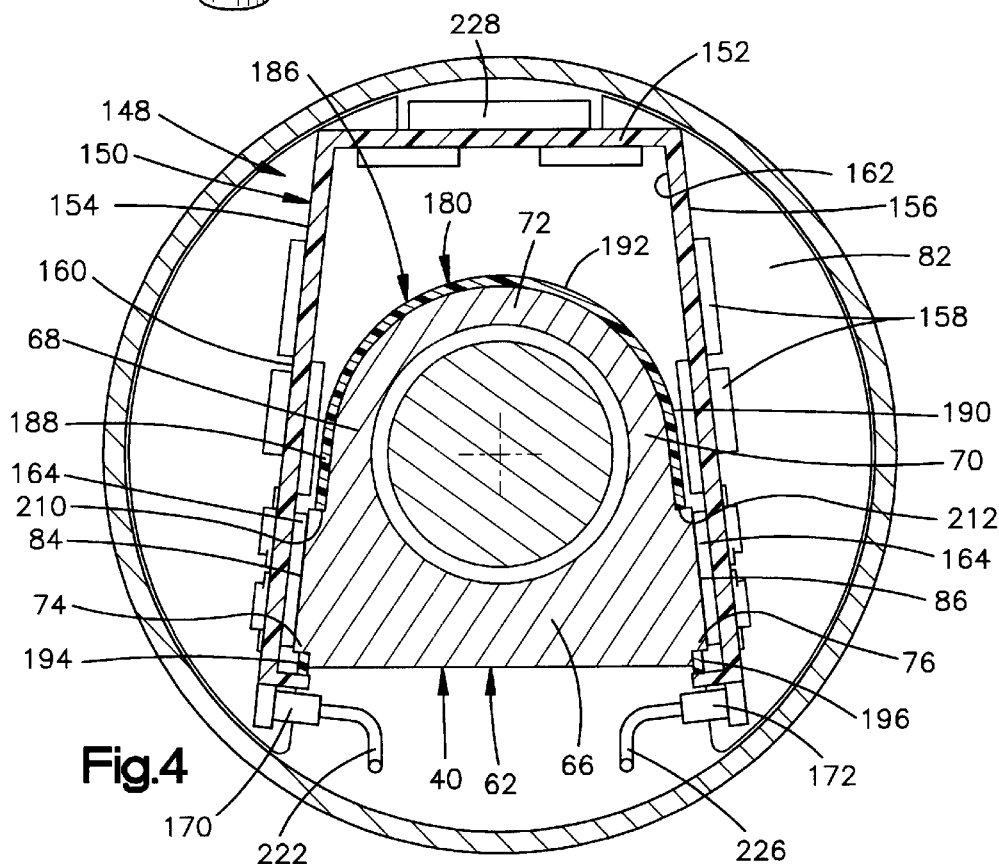
FIG. 4 is a radial sectional view of the steering system, taken generally along line 4—4 of FIG. 2.

The connector portion 62 (FIG. 4) has a hollow D-shaped cross-sectional configuration including a base section 66, first and second side sections 68 and 70, and an arcuate top section 72. The first and second side sections 68 and 70 do not extend parallel to each other but diverge slightly as they extend away from the top section 72 toward the base section 66. The first and second side sections 68 and 70 have first and second end edges 74 and 76, respectively, that extend parallel to the axis 20. The end plates 50 and 52 of the pinion housing 40 are located at opposite ends of the connector portion 62 and have a larger diameter than the connector portion.

A locator pin (not shown) is formed on the first end plate 50. A similar locator pin 80 is formed on the second end plate 52. The locator pins (only 80 shown) are designed to fit into recesses in another piece of the steering system 10 in a snap fit to secure the other piece to the pinion housing 40, as described below.

The end plates 50 and 52 and the connector portion 62 of the pinion housing 40 define a generally toroidal cavity or chamber 82 in the pinion housing 40. The chamber 82 is closed at opposite ends by the end plates 50 and 52. The connector portion 62 of the pinion housing 40 extends through the chamber 82 and defines the inner periphery of the chamber.

The pinion housing 40 includes two heat sinks 84 and 86. The first heat sink 84 is formed as a generally rectangular pad that projects outward from the first side section 68 of the connector portion 62. The second heat sink 86 is located opposite the first heat sink 84, on the second side section 70 of the connector portion 62. The second heat sink 86 is formed as a generally rectangular pad that projects outward from the second side section 70. The heat sinks 84 and 86 are formed as one piece with the other parts of the pinion housing 40.

The outboard housing 90 is preferably cast as one piece from a metal, such as aluminum, but may have a different construction. The outboard housing 90 (FIG. 1) has a generally tubular configuration including a relatively long, small diameter outboard end portion 92 and a relatively short, larger diameter bearing portion 94. The steering member 14 extends axially through a central passage 96 in the outboard housing 90.

The bearing portion 94 of the outboard housing 90 includes a larger diameter portion 98 that is closer to the outboard end portion 92, and a smaller diameter portion 100 that is farther from the outboard end portion 92. An annular, radially extending shoulder surface 102 is formed between the larger diameter portion 98 and the smaller diameter portion 100. The shoulder surface 102 faces toward the pinion housing 40, and toward the shoulder surface 58 on the pinion housing.

The larger diameter portion 98 of the bearing portion 94 of the outboard housing 90 has the same diameter as the larger diameter portion 54 of the first end plate 50 of the pinion housing 40. The smaller diameter portion 100 of the bearing portion 94 of the outboard housing 90 has the same diameter as the smaller diameter portion 56 of the first end plate 50 of the pinion housing 40.

The outboard housing 90 supports a ball nut assembly 110. The ball nut assembly 110 includes a rotationally fixed portion 112 and a rotatable portion 114. The rotatable portion comprises an internally threaded ball nut 116 that is supported on the outboard housing 90 for rotation relative to the outboard housing about the axis 20.

The motor tube 120 is a structural member that extends between and interconnects the pinion housing 40 and the outboard housing 90. In the illustrated embodiment, the motor tube 120 is a one-piece member having a cylindrical configuration centered on the axis 20. The motor tube 120 is preferably made from a metal, such as stainless steel, but could alternatively be made from another material, such as plastic. The motor tube 120 has a substantially constant diameter for its entire length.

The motor tube 120 has an inside diameter that is the same as the diameter of the smaller diameter portion 100 of the bearing portion 94 of the outboard housing 90, and also the same as the diameter of the smaller diameter portion 56 of the first end plate 50 of the pinion housing 50. The motor tube 120 has an outside diameter that is the same as the diameter of the larger diameter portion 98 of the bearing portion 94 of the outboard housing 90, and also the same as the diameter of the larger diameter portion 54 of the first end plate 50 of the pinion housing 40.

As a result, the steering system housing 39, including the motor tube 120, has a constant diameter between the pinion housing 40 and the outboard housing 90, which is the same diameter as the motor tube 120. A first end portion 122 of the motor tube 120 is press fit on and crimped on the smaller diameter portion 100 of the bearing portion 94 of the outboard housing 90, as described below. A second end portion 124 of the motor tube 120 is press fit on and crimped on the smaller diameter portion 56 of the first end plate 50 of the pinion housing 40, as described below.

The steering assembly 10 includes an electric motor 130. The motor 130 includes a stator 132 and a rotor 134. The stator 132 is press fit inside the motor tube 120 at a location radially outward of and encircling the rotor 134.

The rotor 134 encircles a part of the screw thread portion 38 of the steering member 14. A first end portion 136 of the rotor 134 is fixed for rotation with the ball nut 116. The ball nut 116 thereby supports the first end portion 136 of the rotor 134 for rotation about the axis 20. A second end portion 138 of the rotor 134 projects axially past the stator 132, in a direction toward the pinion housing 40.

The steering assembly 10 includes a motor position sensor 140. The motor position sensor 140 is a known device operative to sense the rotational position of the rotor 134. A fixed portion 142 of the motor position sensor 140 is fastened to the inboard side of the second end plate 52 of the pinion housing 50. A rotatable portion 144 of the motor position sensor 140 is fixed to the second end portion 138 of the rotor 134 and is thereby rotatable with the rotor relative to the fixed portion 142 of the motor position sensor.

The steering assembly 10 includes an electronic control unit 148 for helping to control operation of the electric motor 130. The electronic control unit 148 includes a non-planar circuit board 150 on which are mounted the electronic components that control operation of the motor 130.

The circuit board 150 has a non-planar configuration. Specifically, the circuit board 150 in the illustrated configuration has a three-sided configuration including a central leg 152 and first and second side legs 154 and 156. The three-sided configuration is shaped generally like three sides of a relatively tall trapezoid with the side legs 154 and 156 as the two non-parallel sides of the trapezoid. The two side legs 154 and 156 may be the same shape as each other, as shown.

The circuit board 150 can be made of an aluminum sheet base material with a plastic (dielectric) covering on which electrically conductive traces are formed and electronic components mounted. This type of construction would enable the circuit board 150 to be formed in a self-supporting, non-planar configuration of the type illustrated. Alternatively, the circuit board 150 could be formed in other manners.

The circuit board 150 could be formed as one piece and bent to form the three-sided configuration shown. Alternatively, the circuit board 150 could be formed as separate pieces joined together or mounted separately in the steering system 10.

A plurality of electronic components 158 are mounted on the outside 160 of the circuit board 150. There electronic components 158 may includes ASICs and other components needed for controlling the operation of the motor 130. The outside components 158 are preferably mounted on the outside of only the two side legs 154 and 156 of the circuit board 150, and not on the central leg 152, for space considerations.

Additional electronic components are mounted on the inside 162 of the circuit board 150. These components are preferably mounted on both the central leg 152 and the two side legs 154 and 156 of the circuit board 150. These electronic components may include FETs and other components needed for controlling the operation of the motor 130.

Figure 3:
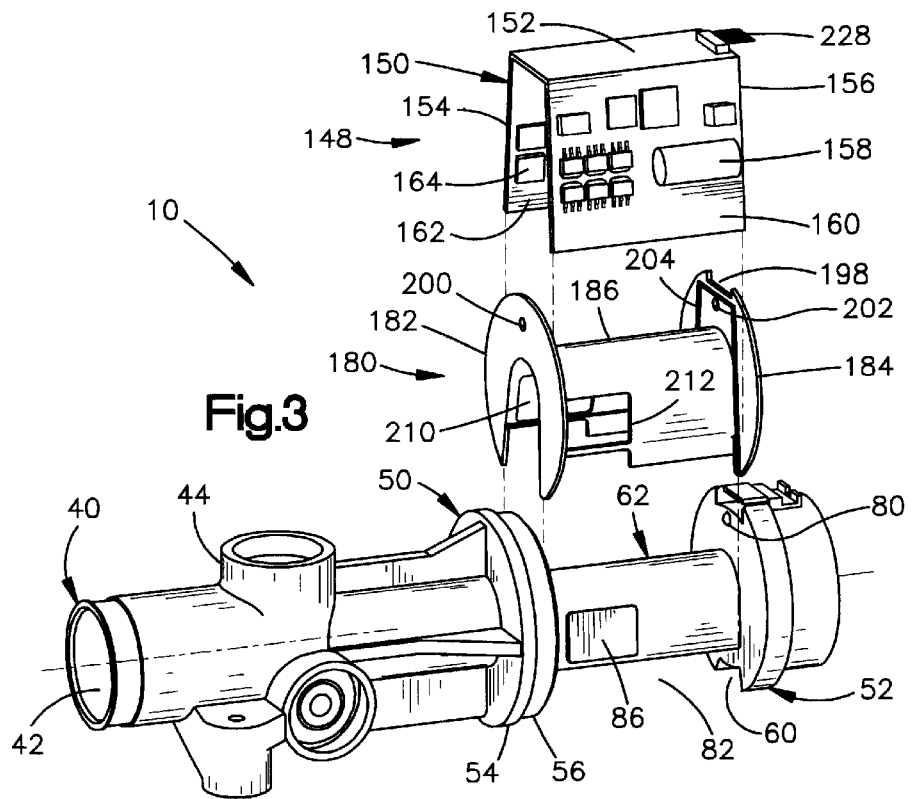
FIG. 3 is an exploded perspective view of portions of the steering system of FIG. 1 including a pinion housing, a board support member, and a circuit board.

For example, the circuit board 150 as illustrated includes a plurality of switches in the form of power transistors, indicated schematically at 164 in FIG. 3. The power transistors may be, for example, FETs such as MOSFET semiconductors. In the illustrated example, the FETs 164 are located on the inside 162 of the circuit board 150, specifically, on the inside of the two side legs 154 and 156. The FETs 164 are engageable with the heat sinks 84 and 86 on the pinion housing 40, as described below, to cool the FETs 164.

The circuit board 150 also includes two electrical connectors 170 and 172 (FIG. 4), one at the lower end portion of either side leg 154 and 156.

The steering system 10 includes a board support 180. The board support 180 is preferably molded as one piece from a plastic material, but could be constructed in a different manner. The board support 180 in the illustrated embodiment is shaped generally as a spool including two end plates 182 and 184 interconnected by a central portion 186.

The central portion 186 of the board support 180 has a configuration similar to that of the connector portion 62 of the pinion housing 40. Specifically, the central portion 186 of the board support 180 has a hollow D-shaped cross-sectional configuration including first and second side legs 188 and 190 and an arcuate central leg 192. The first and second side legs 188 and 190 do not extend parallel to each other but diverge slightly as they extend away from the central leg 192. The first and second side legs 188 and 190 have first and second end edges 194 and 196, respectively, that extend parallel to the axis 20. The board support 180 is open between the end edges 194 and 196, to enable the board support to slip over the connector portion 62 of the pinion housing 40.

The end plates 182 and 184 of the board support 180 are located at opposite ends of the central portion 186 and have a larger diameter than the central portion. The second end plate 184 has a notch 198 in its outer periphery, at the circumferential center radially outward of the central leg 192 of the central portion 186 of the board support 180.

A locator recess 200 is formed in the first end plate 182. A similar locator recess 202 is formed in the second end plate 184. The locator recesses 200 and 202 are received with a snap fit in the locator pins (only 80 shown) in the pinion housing 40, to secure the board support 180 to the pinion housing.

A groove 204 is formed in the inner side surface of the first end plate 182, facing the second end plate 184. The groove 204 has a three-sided configuration that is the same as that of the circuit board 150. A similar groove (not shown) is formed in the inner side surface of the second end plate 184, facing the first end plate 182.

The board support 180 includes two heat sink openings 210 and 212. One heat sink opening 210 is located on the first side leg 188 of the central portion 186 and has a generally rectangular configuration adapted to receive the first heat sink 84 of the pinion housing 40. The second heat sink opening 212 is located opposite the first heat sink opening 210, on the second side leg 190 of the central portion 186. The second heat sink opening 212 has a generally rectangular configuration adapted to receive the second heat sink 86 of the pinion housing 40.

The circuit board 150 at least partially encircles a portion of the steering member 14 at a location spaced axially from the electric motor 130. Specifically, because it is non-planar, the circuit board 150 at least partially encircles the connector portion 62 of the pinion housing 40, and the portion of the steering member 14 that extends through the connector portion. The circuit board 150 subtends an angle of at least about 90 degrees about the axis 20. The circuit board 150 preferably encircles at least 180 degrees of the steering member 14.

The circuit board 150 is located radially outward of the connector portion 62 of the pinion housing 40. The circuit board 150 is located in the chamber 82 in the pinion housing 40, and is supported in the chamber by the support member 180 and the pinion housing 40. The circuit board 150 is movable radially into the chamber 82. When the circuit board 150 is located in the chamber 82, the end plates 50 and 52 of the pinion housing 40 block axial movement of the circuit board in the chamber relative to the pinion housing.

The steering assembly 10 includes electrical wiring for connecting the parts of the steering assembly with vehicle electric wire in, to supply electric current and control signals for the motor 130. The outer end plate 50 of the pinion housing 40 has an opening 220 through which extends lead wiring 222 from the vehicle power supply (not shown). The lead wiring 222 also is connected with a torque sensor, shown schematically at 224, adjacent the input shaft 26. The torque sensor 224 is operative to sense the amount of torque applied to the steering wheel 12.

The lead wiring 222 extends from the opening 220 into the chamber 82 in the pinion housing 40 and terminates in the connector 170 on the circuit board 150. Internal lead wiring 226 of the steering system 10 extends from the second connector 172 on the circuit board 150, through the wiring pass through notch 60 in the inner end plate 52 of the pinion housing 40. The wiring 226 is electrically connected with the stator 132 of the motor 130.

Another electrical connector 228 is located on the central leg 152 of the circuit board 150, adjacent the inner end plate 52 of the pinion housing 40. The connector 228 electrically connects the motor position sensor 140 with the circuit board 150.

During assembly of the steering system 10, the circuit board 150 is associated with the board support 180. The three legs 152–156 of the circuit board 150 snap into the grooves (only 204 shown) in the end plates 182 and 184 of the board support 180. Tabs on the end of the side legs 154 and 156 of the circuit board 150 snap over the side legs 188 and 190 of the board support 180 to help secure the circuit board to the board support.

The sub-assembly of the board support 180 and circuit board 150 is thereafter assembled to the pinion housing 40. The locator pins (only 80 shown) on the pinion housing 40 snap into the locator recesses 200 and 202 of the board support 180, to secure the board support 180 and circuit board 150 to the pinion housing 40. The motor position sensor 140 is at this time also associated with the pinion housing 40 and is electrically connected with the circuit board 150 via the connector 228.

The steering member 14, ball nut assembly 110, stator 132, and rotor 134 are assembled to the outboard housing 90. The motor tube 120 is press fit onto the outboard housing 90. The first end portion 122 of the motor tube 120 fits over the smaller diameter outboard end portion 100 and abuts the shoulder surface 102 on the outboard housing 90. The first end portion 122 of the motor tube 120 is crimped in position on the outboard housing 90 to secure the two pieces together.

The pinion housing 40 and its associated parts are then mated with the outboard housing 90 and its associated parts, and with the motor tube 120. The second end portion 124 of the motor tube 120 fits over the smaller diameter portion 56 of the outer end plate 50 of the pinion housing 40 and abuts the shoulder surface 58. The second end portion 124 of the motor tube 120 is crimped in position on the pinion housing 40 to secure the two pieces together. The motor tube 120, because it is made from metal, acts as a structural member and provides structural support for the steering system 10. The motor tube 120 encircles or encloses the electric motor 130, the circuit board 150, the ball nut 116, and a portion of the pinion housing 40.

During usage of the steering system 10, and specifically during operation of the motor 130, the FETs or power transistors 164 generate a significant amount of heat. This heat can be transferred to the heat sinks 84 and 86 of the pinion housing 40, which is a relatively large, cast metal piece. As a result, the power transistors 164 are in good thermal contact with the pinion housing 40 and can be cooled effectively, even though they are on the inside of the motor tube 120 rather than on the outside. The abutting engagement of the circuit board 150 with the pinion housing 40 enables heat to be transferred directly from the circuit board into the dense metal material of the pinion housing.

The steering assembly 10 is more compact than a typical electric assist steering assembly because it does not have an ECU projecting from the otherwise generally cylindrical configuration. The ECU 148, including the circuit board 150, is enclosed within the motor tube 120.

From the above description of the invention, those skilled in the art will perceive improvements, changes and modifications in the invention. Such improvements, changes and modifications within the skill of the art are intended to be covered by the appended claims.

Having described the invention, we claim:

1. A steering assembly for turning steerable wheels of a vehicle in response to rotation of a steering wheel of the vehicle, said steering assembly comprising:
    a pinion;
    a steering member that is movable axially to effect turning movement of the steerable wheels of the vehicle, said steering member having a rack portion in engagement with said pinion and an externally threaded screw portion;
    an electric motor comprising a rotor and a stator, said stator when energized effecting rotation of said rotor, said threaded screw portion of said steering member extending axially through said electric motor;
    a ball nut rotatable with said rotor and associated with said threaded screw portion of said steering member for effecting axial movement of said steering member in response to rotation of said rotor thereby to turn the steerable wheels of the vehicle;
    an electronic control unit for helping to control operation of said electric motor, said electronic control unit including a circuit board and a plurality of electronic components mounted on said circuit board, said circuit board having a non-planar configuration and at least partially encircling a portion of said steering member at a location spaced axially from said electric motor; and
    a one-piece cylindrical tube radially encircling said steering member, said electric motor, and said electronic control unit.

2. A steering assembly as set forth in claim 1 including a pinion housing having a first section that encloses said pinion and a second section that encloses an axially extending section of said rack portion of said steering member, said second section of said pinion housing being located radially inward of said circuit board.

3. A steering assembly as set forth in claim 1 wherein said circuit board has a plurality of heat-generating components, said pinion housing having spaced apart heat sink portions, said heat-generating components being in a thermally conductive relationship with said heat sink portions of said pinion housing.

4. A steering assembly as set forth in claim 3 wherein said heat generating components are power transistors for said motor.

5. A steering assembly as set forth in claim 1 wherein said circuit board has a three-sided configuration.

6. A steering assembly for turning steerable wheels of a vehicle in response to rotation of a steering wheel of the vehicle, said steering assembly comprising:
    a pinion;
    a steering member that is movable axially to effect turning movement of the steerable wheels of the vehicle, said steering member having a rack portion in engagement with said pinion and an externally threaded screw portion;
    an electric motor comprising a rotor and a stator, said stator when energized effecting rotation of said rotor, said screw thread portion of said steering member extending axially through said electric motor;
    a ball nut rotatable with said rotor and associated with said screw thread portion of said steering member for effecting axial movement of said steering member in response to rotation of said rotor thereby to turn the steerable wheels of the vehicle; and
    an electronic control unit for helping to control operation of said electric motor, said electronic control unit including a circuit board and a plurality of electronic components mounted on said circuit board, said circuit board having a non-planar configuration and at least partially encircling a portion of said steering member at a location spaced axially from said electric motor; and
    a pinion housing having and a connector portion extending axially between disc-shaped end plates, said end plates extending radially outwardly of said connector portion so as to define a toroidal chamber in said pinion housing that is closed at opposite ends by said end plates, said circuit board being located in said chamber and being supported in said chamber by said connector portion.

7. A steering system as set forth in claim 6 wherein said circuit board is movable radially into said chamber and said end plates block axial movement of said circuit board in said chamber relative to said pinion housing.

8. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion in engagement with said pinion and an externally threaded screw portion;

an electric motor comprising a rotor and a stator, said stator when energized effecting rotation of said rotor, said screw thread portion of said steering member extending axially through said electric motor;

a ball nut rotatable with said rotor and associated with said screw thread portion of said steering member for effecting axial movement of said steering member in response to rotation of said rotor thereby to turn the steerable wheels of the vehicle; and an electronic control unit for helping to control operation of said electric motor, said electronic control unit including a circuit board and a plurality of electronic components mounted on said circuit board;

said circuit board having a non-planar configuration, said circuit board encircling at least 180 degrees of said steering member.

9. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion in engagement with said pinion and an externally threaded screw portion;

an electric motor comprising a rotor and a stator, said stator when energized effecting rotation of said rotor, said screw thread portion of said steering member extending axially through said electric motor;

a ball nut rotatable with said rotor and associated with said screw thread portion of said steering member for effecting axial movement of said steering member in response to rotation of said rotor thereby to turn the steerable wheels of the vehicle;

an electronic control unit for helping to control operation of said electric motor, said electronic control unit including a circuit board and a plurality of electronic components mounted on said circuit board, said circuit board having a non-planar configuration and at least partially encircling a portion of said steering member at a location spaced axially from said electric motor; and a one-piece tube that encloses said electric motor and said circuit board and said ball nut and a portion of said pinion housing.

10. A steering assembly as set forth in claim 9 wherein said tube has a substantially constant diameter for its entire length.

11. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion in engagement with said pinion;

an electric motor comprising a rotor and a stator, said stator when energized effecting rotation of said rotor;

a mechanism rotatable with said rotor and associated with said steering member for effecting axial movement of said steering member in response to rotation of said rotor thereby to turn the steerable wheels of the vehicle, and an electronic control unit for controlling operation of said electric motor, said electronic control unit including a circuit board and a plurality of electronic components mounted on said circuit board;

said circuit board having a non-planar configuration and encircling at least 180 degrees of said steering member.

12. A steering assembly as set forth in claim 11 wherein said circuit board has at least two planar board portions extending at an angle to one another.

13. A steering assembly as set forth in claim 11 wherein said circuit board encircles between 200 degrees and 270 degrees of said steering member.

14. A steering assembly as set forth in claim 11 comprising a pinion housing and wherein said circuit board is in a heat sink relationship with said pinion housing.

15. A steering assembly as set forth in claim 11 comprising a one-piece tube that encloses said electric motor and said circuit board and said steering member and that has a substantially constant diameter for its entire length.

16. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion in engagement with said pinion;

an electric motor comprising a rotor and a stator, said stator when energized effecting rotation of said rotor;

a mechanism rotatable with said rotor and associated with said steering member for effecting axial movement of said steering member in response to rotation of said rotor thereby to turn the steerable wheels of the vehicle, and an electronic control unit for controlling operation of said electric motor, said electronic control unit including a circuit board and a plurality of electronic components mounted on said circuit board;

said circuit board having a non-planar configuration and at least partially encircling a portion of said steering member at a location spaced axially from said electric motor;

said steering assembly comprising a one-piece tube that encloses said electric motor and said circuit board and said steering member.

17. A steering assembly as set forth in claim 16 wherein said one-piece tube has a substantially constant diameter for its entire length.

18. A steering assembly as set forth in claim 17 wherein said one-piece tube is made from metal, said steering assembly further comprising an outboard housing and a pinion housing, said tube having a first end portion secured to said outboard housing and a second end portion secured to said pinion housing.

19. A steering assembly as set forth in claim 16 further comprising a pinion housing, said tube enclosing a portion of said pinion housing, said circuit board at least partially encircling said portion of said pinion housing at said location spaced axially from said electric motor.

20. A steering assembly for turning steerable wheels of a vehicle in response to rotation of a steering wheel of the vehicle, said steering assembly comprising:

a pinion;

a housing member defining a chamber;

a steering member that is movable axially in said chamber to effect turning movement of the steerable wheels of the vehicle;

an electric motor disposed in said chamber, said electric motor comprising a rotor and a stator, said stator when energized effecting rotation of said rotor;

a structure disposed in said chamber, said structure effecting axial movement of said steering member in response to rotation of said rotor thereby to turn the steerable wheels of the vehicle; and an electronic control unit disposed in said chamber, said electronic control unit helping to control operation of said electric motor, said electronic control unit including a circuit board and a plurality of electronic components mounted on said circuit board, said circuit board having a non-planar configuration and at least partially encircling a portion of said steering member at a location spaced axially from said electric motor, said housing member comprising a one-piece cylindrical tube radially encircling said steering member, said electric motor, and said electronic control unit.

21. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle;

an electric motor comprising a rotor and a stator, said stator when energized effecting rotation of said rotor;

a structure effecting axial movement of said steering member in response to rotation of said rotor thereby to turn the steerable wheels of the vehicle; and an electronic control unit for helping to control operation of said electric motor, said electronic control unit including a circuit board and a plurality of electronic components mounted on said circuit board;

said circuit board having a non-planar configuration, said circuit board encircling at least 180 degrees of said steering member.

* * * * *